United States Patent
Morioka

(10) Patent No.: US 9,590,804 B2
(45) Date of Patent: Mar. 7, 2017

(54) IDENTIFICATION INFORMATION GENERATION DEVICE AND IDENTIFICATION INFORMATION GENERATION METHOD

(71) Applicant: Sumio Morioka, Tokyo (JP)

(72) Inventor: Sumio Morioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 14/364,096

(22) PCT Filed: Nov. 16, 2012

(86) PCT No.: PCT/JP2012/080405
§ 371 (c)(1),
(2) Date: Jun. 10, 2014

(87) PCT Pub. No.: WO2013/088939
PCT Pub. Date: Jun. 20, 2013

(65) Prior Publication Data
US 2014/0328481 A1    Nov. 6, 2014

(30) Foreign Application Priority Data
Dec. 13, 2011 (JP) .................. 2011-272447

(51) Int. Cl.
*H04L 9/08* (2006.01)
*H04L 9/32* (2006.01)

(52) U.S. Cl.
CPC .......... *H04L 9/0816* (2013.01); *H04L 9/0866* (2013.01); *H04L 9/3278* (2013.01); *H04L 2209/24* (2013.01)

(58) Field of Classification Search
CPC ...................................... H04K 1/00
(Continued)

(56) References Cited

U.S. PATENT DOCUMENTS

| | | | |
|---|---|---|---|
| 5,631,961 A * | 5/1997 | Mills et al. .................. | 380/286 |
| 7,840,803 B2 | 11/2010 | Clarke et al. | |
| 2003/0233546 A1 | 12/2003 | Blom | |

FOREIGN PATENT DOCUMENTS

| | | |
|---|---|---|
| JP | 2005-5304429 A | 10/2005 |
| JP | 2011-123909 A | 6/2011 |

(Continued)

OTHER PUBLICATIONS

"Physical Unclonable Functions for Device Authentication and Secret Key Generation", G. Edward Suh, S. Devadas, DAC 2007, pp. 9-14.

(Continued)

*Primary Examiner* — Jacob Lipman

(57) ABSTRACT

Provided is an identification information generation device capable of generating identification information with its complete individual identifiability guaranteed. The identification information generation device comprises: an information separation means for separating a cryptographic key of k bits (k is an integer equal to or larger than 1) and second identification information of (r−m) bits (m is an integer equal to or larger than 1) from first identification information of r bits (r is an integer equal to or larger than 2) outputted from an identification information output means which is impossible to physically duplicated and outputs the same response to the same request for response; an information connection means for outputting fourth identification information by connecting the second identification information with third identification information of m bits capable of identifying x devices; and an encryption means for generating fifth identification information of r bits by performing predetermined processing on the fourth identification information by the use of the cryptographic key.

11 Claims, 4 Drawing Sheets

(58) Field of Classification Search
USPC .......................................................... 380/28
See application file for complete search history.

(56) References Cited

FOREIGN PATENT DOCUMENTS

WO    2010/105993 A2    9/2010
WO    2011/089143 A1    7/2011

OTHER PUBLICATIONS

"Hardware authentication based on PUFs and SHA-3 2nd round candidates", S. Eiroa, I. Baturone, ICM 2010, pp. 319-322.
"Secure and Robust Error Correction for Physical Unclonable Functions", M. Yu, S. Devadas, IEEE Design and Test of computers, vol. 27, No. 1, pp. 48-65.
"Design of Novel Delay-Time Difference Measurable Arbiter-PUF and Evaluation of Uniqueness on the Generated IDs", Kota Furuhashi et al., The 28th Symposium on Cryptography and Information Security (SCIS 2011), Jan. 25-28, 2011, 2D2-3.
English Translation of Written opinion for PCT Application No. PCT/JP2012/080405.
International Search Report for PCT Application No. PCT/JP2012/080405, mailed on Jan. 8, 2013.

\* cited by examiner

IDENTIFICATION INFORMATION GENERATION DEVICE AND IDENTIFICATION INFORMATION GENERATION METHOD

This application is a National Stage Entry of PCT/JP2012/080405 filed on Nov. 16, 2012, which claims priority from Japanese Patent Application 2011-272447 filed on Dec. 13, 2011, the contents of all of which are incorporated herein by reference, in their entirety.

TECHNICAL FIELD

The present invention relates to an identification information generation device and an identification information generation method which generate identification information capable of identifying individuals.

BACKGROUND ART

In recent years, security for preventing forgery and information leakage has become important with regard to mobile devices, IC (Integrated Circuit) cards and other devices. In that case, it is general that ID (Identification Data) is given to each device, and the ID is used in security management such as device authentication and encryption. With such security management, it is possible to achieve an effect such as that even if the security of a certain device is destroyed, impact of its influence on other devices can be prevented.

Usually, a mechanism for generating a unique ID to each individual is implemented not by software but by hardware, from a safety point of view. As the hardware, for example, a semiconductor device such as an LSI (Large-Scale Integration) is used. In that case, it is not realistic to change a manufacturing mask for each semiconductor chip. For this reason, a value of ID (hereafter, when referring to a value itself of ID, it is referred to as an ID value) is not embedded in a logic circuit or the like of the semiconductor chip, but is written into an NVRAM (Non-Volatile Random Access Memory) or is set by blowing a fuse on the semiconductor chip.

On the other hand, a method of physical attack, side channel attack or the like against semiconductor devices is making progress year after year, and accordingly risk of decryption or falsification of ID which is set by means of an NVRAM or a fuse is increasing.

In order to cope with such risk, sometimes used is an ID generation mechanism called PUF (Physical Unclonable Function) which is difficult to falsify, that is, excellent in tamper resistance. A PUF circuit is a circuit for implementing a PUF mechanism, which outputs a measurement result of a physical or electrical characteristic (hereafter, simply referred to as a "physical characteristic") which is unique to each individual of LSI chips, such as difference in circuit speed caused by fabrication variability, as an ID value.

It is generally impossible to make a duplicate device having completely the same physical characteristic as that of the original one. Therefore, a PUF circuit employing difference in a physical characteristic between individuals is equipped with "unclonability". Additionally, exact prediction of a physical characteristic value for each individual is also impossible. Accordingly, an ID value outputted by the PUF circuit is also equipped with "unpredictability" meaning impossibility to predict the value.

As a typical PUF, methods employing, as an ID value, difference between individuals in a physical characteristic, such as the oscillation frequency of a ring oscillator, the delay time difference of a circuit and the initial value of a memory just after power on, are disclosed in Japanese Patent Application Laid-Open No. 2011-123909 (hereafter, referred to as "Patent Document 1"), in G. Edward Suh, S. Devadas, "Physical Unclonable Functions for Device Authentication and Secret Key Generation", DAC 2007, pp. 9-14 (hereafter, referred to as "Non-patent Document 1"), in S. Eiroa, I. Baturone, "Hardware authentication based on PUFs and SHA-3 2nd round candidates", ICM 2010, pp. 319-322 (hereafter, referred to as "Non-patent Document 2"), and in M. Yu, S. Devadas, "Secure and Robust Error Correction for Physical Unclonable Functions", IEEE Design and Test of Computers, Vol. 27, No. 1, pp. 48-65 (hereafter, referred to as "Non-patent Document 3").

An input to a PUF is referred to as a challenge. An output the PUF returns to the challenge is referred to as a response. In view of the purpose of employing a PUF, responses to the same challenge are required to always be the same value for the same individual and to surely be different values for different individuals.

Hereafter, "obtainability of always the same response to the same challenge" is referred to as "response repeatability", and "obtainability of surely different responses for different individuals" as "individual identifiability".

However, in a real PUF, there may occur a phenomenon of the PUF returning different values to different entries of the same challenge even when the entries of the same challenge are made to the same individual. That is, a real PUF is not necessarily equipped with response repeatability. In this respect, Non-patent Document 3 discloses a method for coping with this problem by performing error correction so as to enable obtaining the same response to the same challenge.

In a PUF using LSI fabrication variability, an ID value generated by the PUF cannot be known before completion of the LSI fabrication, unlike in a method of setting an ID value into a nonvolatile memory or a fuse at a time of LSI fabrication. Furthermore, it is also impossible to control LSI fabrication in a manner of enabling the PUF to generate a specific ID value.

Therefore, it is necessary to check, after fabricating LSIs, whether each PUF embedded in the respective LSIs generates a different ID value from that of every other LSI having been fabricated in the past. However, the checking takes a lot of time because it needs to be performed on whole of the same type of LSIs with the same PUF structure embedded therein which have been fabricated in the past. If a PUF generating the same ID value as that of another one is found, an LSI with the PUF embedded therein cannot be shipped and accordingly needs to be scrapped. For this reason, the yield of an LSI with an embedded PUF is decreased. Consequently, the long checking time and the decrease in yield cause cost increase. Even if the LSIs pass the post-fabrication check, there still remains a problem arising from their PUFs' using a physical or electrical characteristic. That is, it is possible that, at a time of using the LSIs after their shipment, some PUF generates the same ID value as that of another owing to change in an operating condition such as temperature; that is, individual identifiability becomes impossible to secure.

SUMMARY OF INVENTION

Technical Problem

As has been described above, technologies of improving design and fabrication methods so as to increase individual identifiability of a PUF output value have been disclosed. However, what these technologies do is only to improve the possibility of a PUF output value's being equipped with individual identifiability, but it cannot reach the level of guaranteeing that a PUF output value is equipped with perfect individual identifiability, in other words, that the PUF always returns a different response from that of another individual's PUF to the same challenge. Perfect individual identifiability needs to be guaranteed when a PUF is used for a critical use for dealing with critical information or is installed in a mass-produced device.

Thus, perfect individual identifiability is required of an identification information generation device such as a PUF. Furthermore, individual identifiability of the identification information generation device needs to be guaranteed even under aging and environmental variation after the product shipment.

OBJECT OF INVENTION

The present invention has been accomplished in view of the above-mentioned technical problem, and accordingly its objective is to provide an identification information generation device and an identification information generation method which are capable of generating identification information whose perfect individual identifiability is guaranteed.

Solution to Problem

An identification information generation device of the present invention is characterized by that it comprises: an information separation means for separating a cryptographic key of k bits (k is an integer equal to or larger than 1) and second identification information of (r−m) bits (m is an integer equal to or larger than 1) from first identification information of r bits (r is an integer equal to or larger than 2) outputted from an identification information output means which is impossible to physically duplicated and outputs the same responses to the same request for response; an information connection means for outputting fourth identification information by connecting the second identification information with third identification information of m bits capable of identifying x devices; and an encryption means for generating fifth identification information of r bits by performing predetermined processing on the fourth identification information by the use of the cryptographic key.

An identification information generation method of the present invention is characterized by that it comprises: separating a cryptographic key of k bits (k is an integer equal to or larger than 1) and second identification information of (r−m) bits (m is an integer equal to or larger than 1) from first identification information of r bits (r is an integer equal to or larger than 2) outputted from an identification information output means which is impossible to physically duplicated and outputs the same response to the same request for response; outputting fourth identification information by connecting the second identification information with third identification information of m bits capable of identifying x devices; and generating fifth identification information of r bits by performing predetermined processing on the fourth identification information by the use of the cryptographic key.

Advantageous Effect of Invention

According to the present invention, it is possible to obtain an identification information generation device and an identification information generation method which are equipped with individual identifiability.

DESCRIPTION OF EMBODIMENTS

First Exemplary Embodiment

Figure 1:
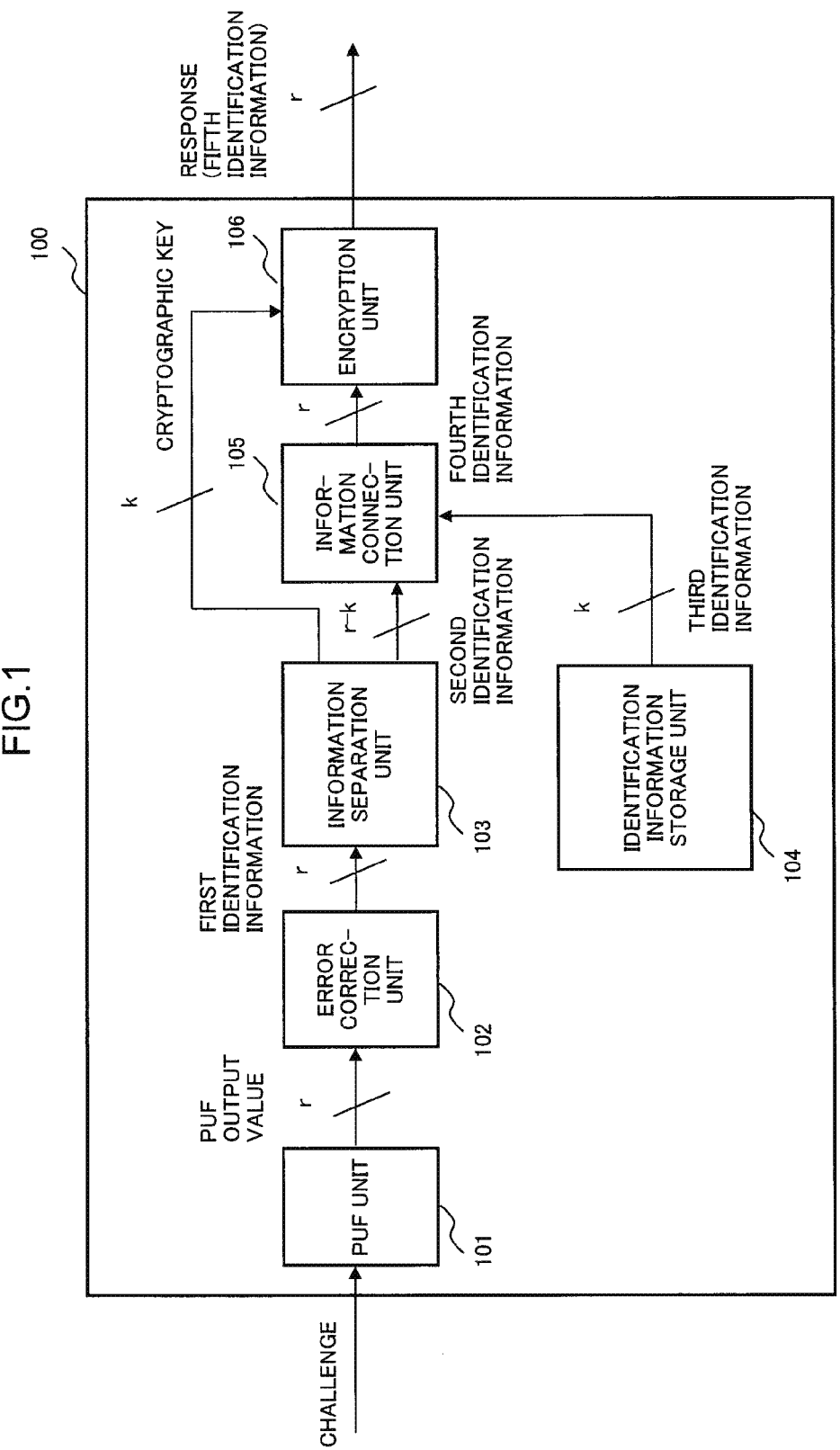
FIG. 1 is a block diagram showing a configuration of an identification information generation device of a first exemplary embodiment of the present invention

A first exemplary embodiment of the present invention will be described with reference to FIG. 1. An identification information generation device 100 of the present exemplary embodiment includes a PUF unit 101, an error correction unit 102, an information separation unit 103, an identification information storage unit 104, an information connection unit 105 and an encryption unit 106.

The PUF unit 101 outputs a PUF output value of r bits (r is an integer equal to or larger than 2) which is based on a predetermined physical character of the PUF unit 101 as a response to a challenge from outside. As the PUF unit 101, for example, the PUF circuits disclosed in Patent Document 1 or Non-patent Documents 1 to 3 may be used. Alternatively, a PUF circuit other than those may be used.

As described before, response repeatability is required of the PUF unit 101. To secure the response repeatability, error correction by the error correction unit 102 is performed on the PUF output value. To the error correction by the error correction unit 102, the technology disclosed in Non-patent Document 3 may be applied. Hereafter, a PUF output value having been performed the error correction by the error correction unit 102, that is, the one with its response repeatability guaranteed, is referred to as first identification information.

The information separation unit 103 separates the first identification information into two pieces of information; a cryptographic key being a k bit value (k is an integer equal to or larger than 1) and second identification information of (r−k) bits. Here, to generate the second identification information, r>k is required.

A method of separating the cryptographic key of k bits may be any one which selects optional k bits within the first identification information of r bits, and is not limited to a specific selection method such as of selecting upper k bits or lower k bits.

The identification information storage unit 104 is a unit for storing the ID value (identification information) of the identification information generation device 100 and outputs third identification information of k bits which is unique to the identification information generation device 100. The identification information storage unit 104 is implemented by a nonvolatile memory or a fuse. The identification information storage unit 104 is comprised for the purpose of securing individual identifiability of the identification information generation device 100.

Here, assuming x as the number of devices to be identified by exploiting fifth identification information, described later, which is final output of the identification information generation device 100, it is necessary to assign, to the x devices, pieces of the third identification information which are unique to respective ones of the devices. Therefore, the number of bits of the third identification information, k, needs to satisfy $2^k \geq x$.

The information connection unit 105 connects the second identification information of (r−k) bits with the third identification information of k bits and thereby generates fourth identification information of r bits.

The expression "connection" used here means combining simply two pieces of information to generate a value with a total bit number equal to the sum of the bit numbers of the two pieces of information. A way of combining two pieces of information is not limited to a simplest method such as of connecting the two pieces of information as, respectively, the upper bits and the lower bits. For example, it may be such that the upper-lower order of the bits of each of two pieces of information is complicatedly altered, and thus altered two pieces of information are connected as, respectively, the upper bits and the lower bits. Alternatively, it may be such that two pieces of information are simply connected as, respectively, the upper bits and the lower bits, and the bit order is subsequently altered.

The encryption unit 106 encrypts the fourth identification information of r bits by the use of the cryptographic key of k bits, and thereby outputs the fifth identification information of r bits as a response of the identification information generation device 100.

Next, a description will be given of a principle which enables the fifth identification information, which is the final output of the identification information generation device 100 of the present exemplary embodiment, to secure unclonability, response repeatability, individual identifiability and unpredictability.

The identification information generation device 100 of the present exemplary embodiment includes the PUF unit 101. As a result, the identification information generation device 100 satisfies the necessary condition for being equipped with comprising unclonability.

The identification information generation device 100 further comprises the error correction unit 102 for performing error correction on an output value from the PUF unit 101. It further comprises the identification information storage unit 104 for storing the third identification information having a fixed value. As a result of above, the identification information generation device 100 satisfies the necessary condition for guaranteeing response repeatability.

Further, by the identification information storage unit 104 storing the third identification information unique to the identification information generation device 100, the necessary condition for guaranteeing individual identifiability is also satisfied.

However, it is possible also for a third party to acquire the third identification information by analyzing the identification information storage unit 104. Therefore, unpredictability is secured by altering the third identification information through some processing, not using the third identification information as it is.

Because individual identifiability needs to be simultaneously secured, the above-mentioned processing for securing unpredictability is required to have a property of never relating different values to the same value, that is, of no "possibility of conflict". For this reason, encryption is used as a processing method for securing unpredictability. Specifically, encryption is performed on the fourth identification information having the third identification information included therein.

As a cryptographic key used for the above-mentioned encryption, part of the first identification information is employed. Because of the use of the first identification information for the cryptographic key, confidentiality of the key is secured.

The other part of the first identification information than that for the cryptographic key, that is, the second identification information, is connected with the third identification information, and the resultant information is used as a plain text. Because the resultant information (the fourth identification information) generated by the connection of the second identification information, included in the first identification information, with the third identification information is used as a plain text, individual identifiability of the fifth identification information is guaranteed.

Here, because the above-mentioned cryptographic key is created by converting to it part of the first identification information generated from a PUF output value, the above-mentioned cryptographic key does not necessarily differ from those of the other identification information generation devices.

When the cryptographic key of the identification information generation device 100 is the same as that of some other identification information generation device, the fifth identification information is necessarily different from that of the other identification information generation device because the third identification information is different from that of the other identification information generation device. It is because when the same cryptographic key is used, a cryptogram should be one-to-one mapping of a plain text because of the nature of cryptography.

Next, when the cryptographic key is different from that of some other identification information generation device, the cryptogram may be the same as that of the other identification information generation device with a certain probability p. For example, when AES-128 is used, the number of bits is 128 for both a cryptographic key and a plaintext, and accordingly the extent of the input space, that is, the total number of pieces of information each able to be expressed by one combination of a cryptographic key and a plaintext, is $2^{256}$. Because the number of bits is 128 for a cryptogram, the extent of the output space (the number of pieces of information each able to be expressed by one cryptogram) is $2^{128}$. That is, when the same plaintext is encrypted by different cryptographic keys, the total number of combination patterns of one cryptographic key and one plaintext which generate the same cryptogram is $2^{128}$. Accordingly, while the probability p is dependent on selection of a cryptographic key, when AES-128 is used as an encryption method, the probability p of generating the same cryptogram is $½^{128}$ ($=3 \times 10^{(-39)}$). However, this value of the probability p is so extremely small that it can be substantially regarded as zero in usual use. As a result, it can be said that the fifth identification information, which is output of the present identification information generation device 100, is equipped with perfect individual identifiability.

When block encryption which encrypts a plurality of blocks is used as the encryption method, the probability of the whole of the generated cryptograms having completely the same content can be further reduced.

First, when the first block of a cryptogram is different from that of other identification information generation devices, it is apparent that the whole of the cryptogram becomes different from that of the other devices, and accordingly there is no problem.

When the first block of a cryptogram is the same as that of some other identification information generation device, the next block of the cryptogram may be the same as that of the other device with a certain probability p. However, the probability that the cryptograms of the two blocks are the same between the two devices is p^2, which is an extremely small value even if usual encryption is used.

Generally, when block encryption is performed by dividing information into L blocks (L is an integer equal to or larger than 1), the probability P of generating cryptograms having wholly, completely the same content becomes extremely small. Specifically, block encryption is performed here by dividing the fourth identification information of r bits into blocks of b bits satisfying r=bL (b is an integer equal to or larger than 1). In this case, when AES-128 is used as the encryption method, for example, P is expressed as P=p^n=1/((2^128)^n), thus giving a value which can be substantially regarded as zero.

Figure 2:
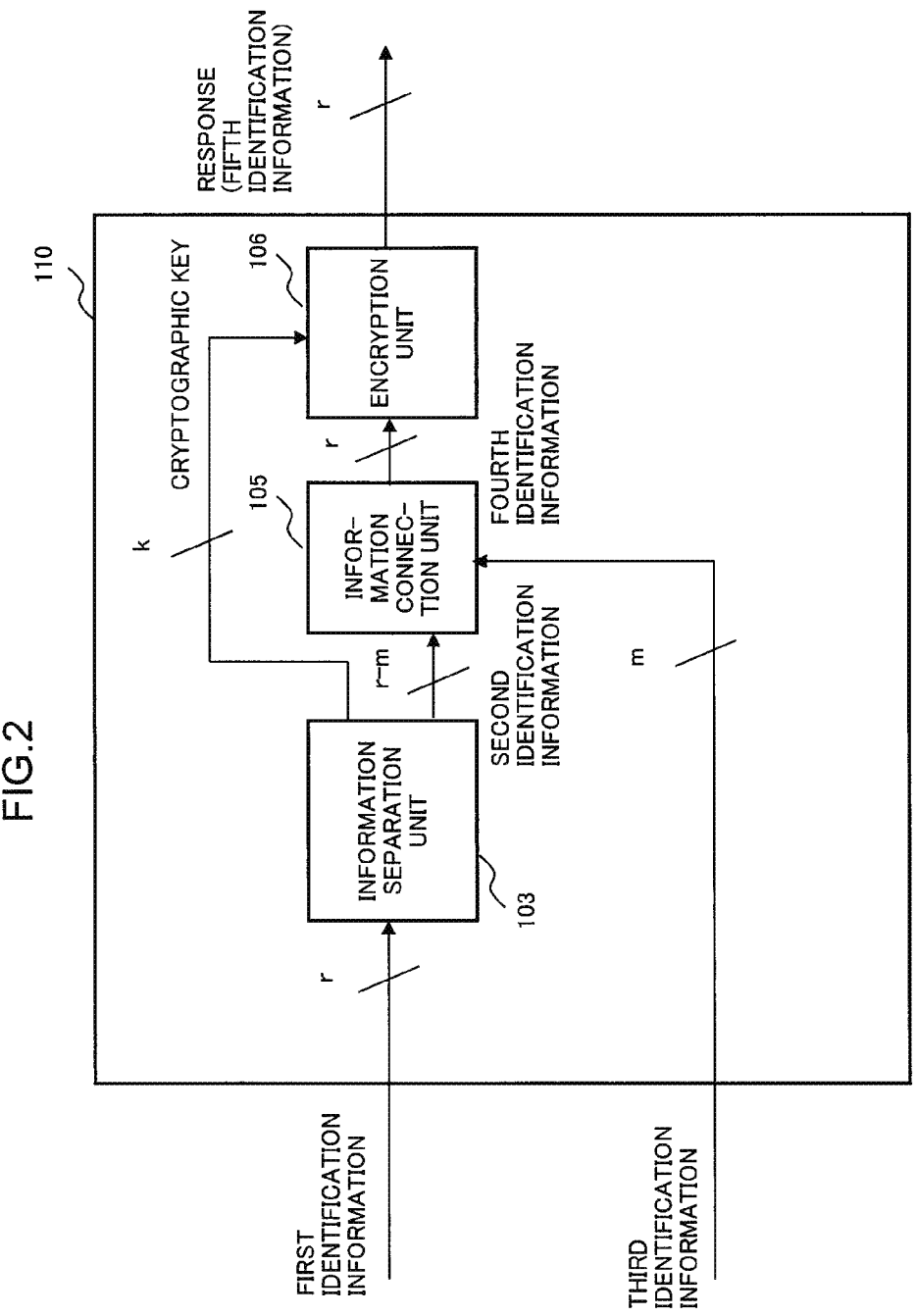
FIG. 2 is a block diagram showing a configuration of a modified example of the identification information generation device of the first exemplary embodiment

FIG. 2 is a block diagram showing a configuration of an identification information generation device 110 which includes only structures essential to the present exemplary embodiment. The identification information generation device 110, which is a modified example of the identification information generation device 100, does not include the PUF unit 101, the error correction unit 102 and the identification information storage unit 104 inside, and receives the first identification information and the third identification information from outside. Thus, the first identification information and the third identification information, which are internally generated in the case of the identification information generation device 100, are inputted from outside in the case of the identification information generation device 110. The identification information generation device 110 internally performs separation of the first identification information, connection of the second identification information with the third identification information and encryption of the fourth identification information.

Therefore, also the identification information generation device 110 is equipped with response repeatability, individual identifiability and unpredictability. However, unlike the identification information generation device 100, the identification information generation device 110 is not equipped with unclonability.

Here, in the identification information generation device 110 of FIG. 2, a condition to be satisfied by the number of bits of the second identification information and by that of the cryptographic key is relaxed. That is, from the first identification information of r bits, the cryptographic key of k bits and second identification information of (r−m) bits (m is an integer equal to or larger than 1) are separated in a bitwise manner.

Here, the condition may be r>k+(r−m). That is, the first identification information may include some number of bits which are to be separated as neither the second identification information nor the cryptographic key.

If the same bit in the first identification information is included in both the second identification information and the cryptographic key, an input space constructed by plain texts and the cryptographic key becomes small. Therefore, it is desirable that none of the bits in the first identification information is included in both the second identification information and the cryptographic key.

Assuming x as the number of devices to be identified by exploiting fifth identification information, described later, which is final output of the identification information generation device 100, it is necessary to assign, to the x devices, pieces of the third identification information which are unique to respective ones of the devices. Therefore, the number of bits of the third identification information, m, needs to satisfy $2^m \geq x$.

The third identification information of m bits is connected with the second identification information of (r−m) bits to generate the fourth identification information of r bits.

As has been described above, the identification information generation device 100 of the present exemplary embodiment secures response repeatability by performing error correction on a PUF output value equipped with unpredictability. Further, it encrypts identification information unique to itself, that is, identification information equipped with individual identifiability, by using part of the PUF output value as the cryptographic key. As a result, the identification information generation device 100 is equipped with unpredictability, response repeatability and individual identifiability. Further, because of including the PUF unit, the identification information generation device 100 is also equipped with unclonability.

The characteristics of the present exemplary embodiment will be summarized below. As one of important characteristics of the present exemplary embodiment, mentioned is the use of a general PUF, which generates a PUF output value by the use of a physical characteristic of an individual, in combination with the third identification information unique to the individual. The third identification information is used for the purpose of guaranteeing, at products shipment, that the fifth identification information generated finally is different for each individual. The PUF output value is used for the purpose of guaranteeing unclonability of the output.

As another important characteristic of the present exemplary embodiment, mentioned is the use of encryption and of the first identification information as the cryptographic key. Because of the use of encryption instead of a hash function, the number of bits of a plain text and that of a cryptogram are the same, and furthermore, they may take an optional value. Accordingly, by increasing the bit-width of the fourth identification information inputted to the encryption unit, it is possible to prevent generation of the same identification information by different identification information generation devices, that is, conflict. Further, because of the use of the first identification information as the cryptographic key, unclonability of the output is not spoiled even when at all the third identification information was read by a third party.

The processing performed at the encryption unit 106 is that of encrypting the fourth identification information, which corresponds to a plain text in the encryption, by the use of the cryptographic key. Similar kinds of processing are sometimes called "randomizing", "disturbance" and the like, and the processing used here does not necessarily need to be the one called "encryption".

Figure 3:
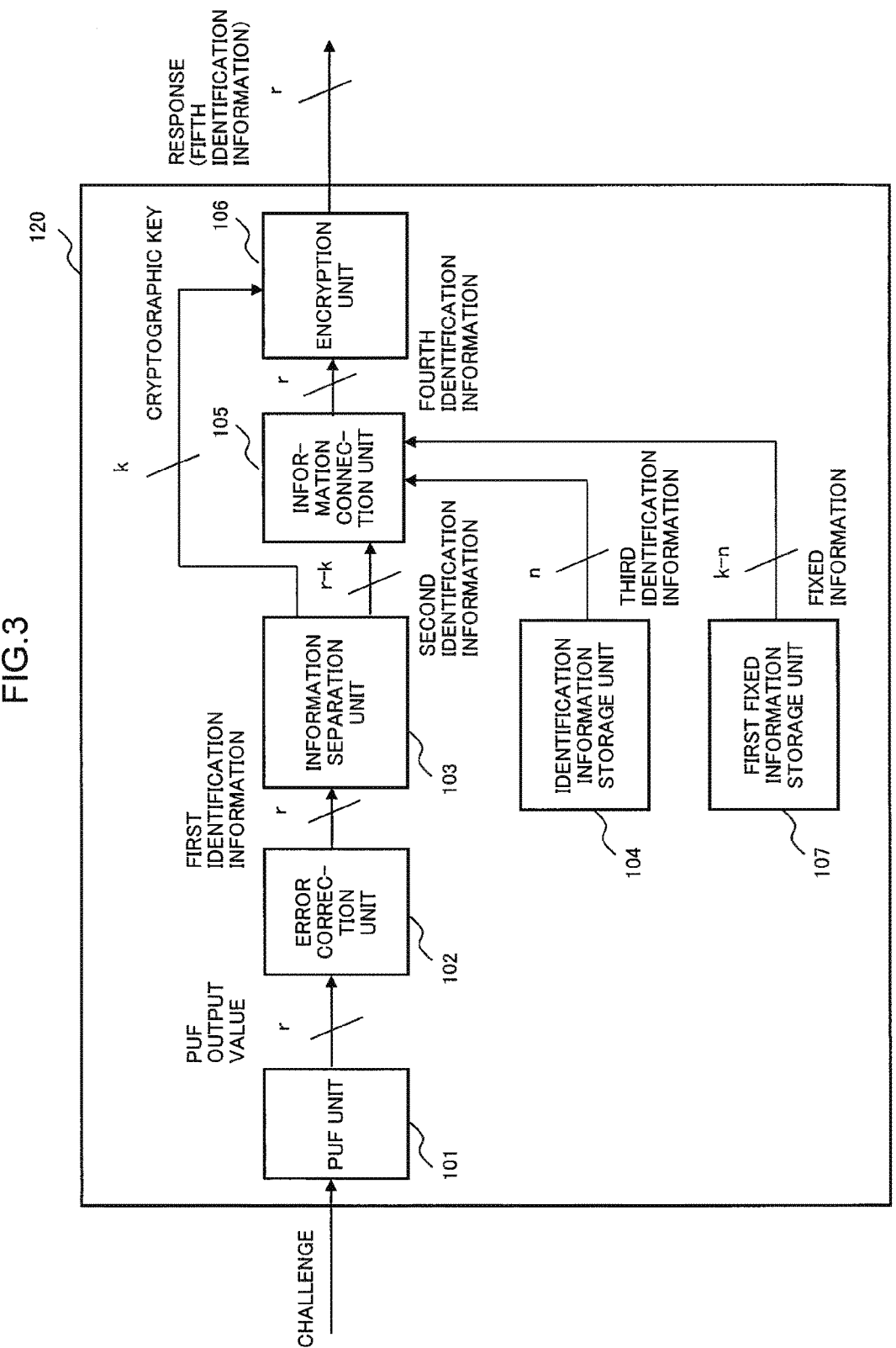
FIG. 3 is a block diagram showing a configuration of a second modified example of the identification information generation device of the first exemplary embodiment

FIG. 3 is a block diagram of an identification information generation device 120 having higher safety than that of the identification information generation device 100 of FIG. 1. The identification information generation device 120 is different from the identification information generation device 100 in including a fixed information storage unit 107 in addition to the identification information storage unit 104. The fixed information storage unit 107 stores first fixed information which takes a fixed value not depending on identification information generation devices. The first fixed information is embedded, for example, in a logic circuit, in order to secure tamper resistance. Then, the first fixed information is connected with the second identification information and the third identification information by the information connection unit 105, and thus combined information is encrypted at the encryption unit 106.

Second Exemplary Embodiment

Figure 4:
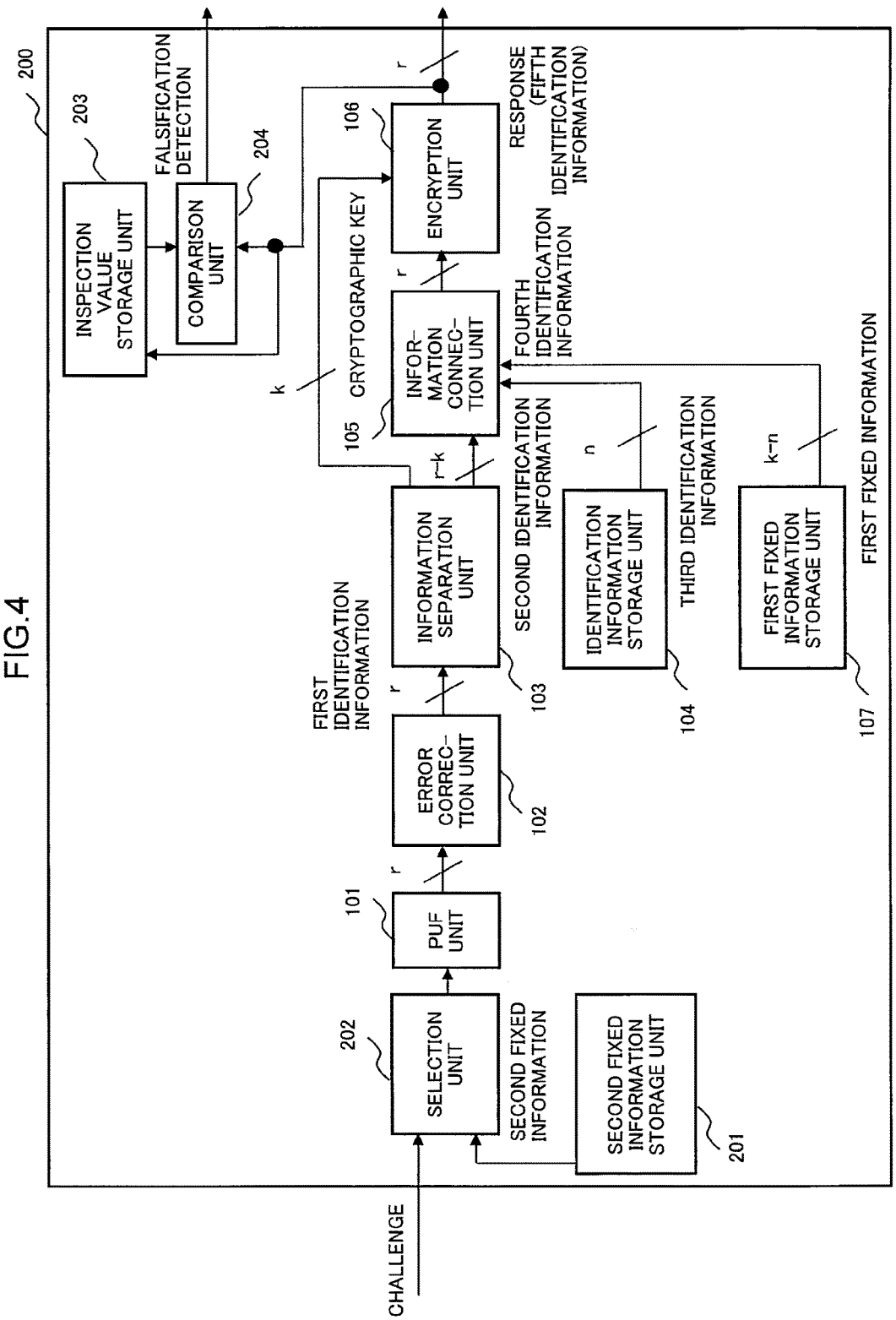
FIG. 4 is a block diagram showing a configuration of an identification information generation device provided with a falsification detection function according to a second exemplary embodiment of the present invention.

An identification information generation device of the present invention may include a falsification detection function concerning identification information. FIG. 4 is a block diagram showing a configuration of an identification information generation device of a second exemplary embodiment. The identification information generation device 200 of the present exemplary embodiment is the one which is additionally provided with a function to detect the presence or absence of falsification against the identification information generation device 120 of the second exemplary embodiment shown in FIG. 2.

The identification information generation device 200 comprises a second fixed information storage unit 201, a selection unit 202, an inspection value storage unit 203 and a comparison unit 204, in addition to the configuration of the identification information generation device 120 of FIG. 2.

The second fixed information storage unit 201 stores second fixed information to be provided as a challenge at a time of detecting falsification, as will be described later.

The selection unit 202 selects either one of a challenge from outside and a fixed challenge from the second fixed information storage unit 201, according to a mode setting signal (not illustrated in the drawing). The challenge from the outside is a challenge at the normal operation mode in response to which the identification information generation device generates identification information. The challenge from the second fixed information storage unit 201 is a challenge for the falsification detection mode.

The inspection value storage unit 203 stores an inspection value used at the falsification detection mode.

The comparison unit 204 compares the inspection value from the inspection value storage unit 203 with the fifth identification information from the encryption unit 106.

Operation of the falsification detection function concerning identification information will be described below. First, before the identification information generation device 200 is put into use, that is, at a time of such as its inspection before shipment, an inspection value is set into the inspection value storage unit 203. To perform the setting, the falsification detection mode is designated via the mode setting signal, and the selection unit 202 is thereby caused to select the fixed challenge for the falsification detection mode from the second fixed information storage unit 201. A response (the fifth identification information) obtained through the challenge for the falsification detection mode is stored, as an inspection value, into the inspection value storage unit 203.

Also during use of the identification information generation device 200 after its shipment, before starting actual operation, the falsification detection mode is once designated via the mode setting signal. At that time, the selection unit 202 selects the fixed challenge for the falsification detection mode from the second fixed information storage unit 201. Then, a response at that time is compared with the inspection value stored in the inspection value storage unit 203 by the comparison unit 204.

If at least either of the third identification information, which is a stored value in the identification information storage unit 104, and the inspection value stored in the inspection value storage unit 203 has been falsified, the two inputs to the comparison unit 204 are not coincident with each other, and accordingly the occurrence of the falsification can be detected.

After thus inspecting the presence or absence of falsification at the falsification detection mode, the normal operation mode is designated via the mode setting signal, and the selection unit 202 thereby selects a challenge from outside. After that, the identification information generation device 200 performs the normal operation of identification information generation.

As has been described above, the identification information generation device 200 of the present exemplary embodiment has the effect of enabling detection of occurrence of falsification, in addition to the effect the identification information generation device 110 has.

Although the present invention has been described above with reference to the exemplary embodiments, the present invention is not limited in accordance with the above description. Various changes and modifications which can be understood by those skilled in the art may be made to the configurations and details of the present invention. Further, the above-described exemplary embodiments may be combined with each other. For example, in the third exemplary embodiment of FIG. 4, modification may be made in a manner such as to omit the first fixed information storage unit 107, or to dispose the second fixed information storage unit 201, the selection unit 202, the PUF unit 101 and the error correction unit 102 at the outside.

Although the present invention has been described above with reference to the exemplary embodiments, the present invention is not limited to the above-described exemplary embodiments. Various changes and modifications which can be understood by those skilled in the art may be made to the configurations and details of the present invention, within the scope of the present invention.

This application is based upon and claims the benefit of priority from Japanese Patent Application No. 2011-272447, filed on Dec. 13, 2011, the disclosure of which is incorporated herein in its entirety by reference.

REFERENCE SIGNS LIST 100, 110, 120, 200 identification information generation device
101 PUF unit
102 error correction unit
103 information separation unit
104 identification information storage unit
105 information connection unit
106 encryption unit
107 first fixed information storage unit
201 second fixed information storage unit
202 selection unit
203 inspection value storage unit
204 comparison unit

What is claimed is:
1. An identification information generation device comprising:
an information separation unit that separates a cryptographic key of k bits, where k is an integer equal to or larger than 1, and second identification information of r-m bits, where m is an integer equal to or larger than 1, from first identification information of r bits, where r is an integer equal to or larger than 2, outputted from an identification information output unit that outputs a same response to a same request for response, the identification information output unit outputting the first identification information using a physical unclonable function (PUF);
an information connection unit that outputs fourth identification information by connecting the second identification information with third identification information of m bits which exposits one or more characteristics of x devices, and can thereby identify the x devices; and
an encryption unit that generates fifth identification information of r bits by performing predetermined processing on the fourth identification information by the use of the cryptographic key.

2. The identification information generation device according to claim 1, wherein $$2^m \geq x,$$

m=k and
r≥2m
are simultaneously satisfied.

3. The identification information generation device according to claim 1 further comprising
an identification information storage unit that stores the third identification information.

4. The identification information generation device according to claim 1, further comprising the identification information output unit.

5. The identification information generation device according to claim 1, wherein
the information separation unit includes an information separation circuit that separates a cryptographic key of k bits, where k is an integer equal to or larger than 1, and second identification information of r-m bits, where m is an integer equal to or larger than 1, from first identification information of r bits, where r is an integer equal to or larger than 2, outputted from an identification information output unit that outputs a same response to a same request for response, the identification information output unit outputting the first identification information using physical unclonable function (PUF);
the information connection unit includes an information connection circuit that outputs fourth identification information by connecting the second identification information with third identification information of m bits which is capable of identifying x devices; and
the encryption unit includes an encryption circuit that generates fifth identification information of r bits by performing predetermined processing on the fourth identification information by the use of the cryptographic key.

6. The identification information generation device according to claim 1 comprising
the identification information output unit including: a characteristic information generation unit that outputs predetermined physical characteristic information to the request for response, the characteristic information generation unit outputting the first identification information using the physical unclonable function (PUF); and a characteristic information processing unit that performs-a predetermined operation on the physical characteristic information and outputs the first identification information.

7. The identification information generation device according to claim 6 comprising:
a second fixed information storage unit that stores second fixed information;
a selection unit that selects, as the request for response, between an external challenge input from outside and the second fixed information;
an inspection value storage unit that stores, as an inspection value, the fifth identification information of when the second fixed information is selected as the request for response; and
a comparison unit that compares the inspection value with the fifth identification information in case that the external challenge input is selected as the request for response.

8. The identification information generation device according to claim 1, wherein
the information connection unit connects, instead of the second identification information and the third identification information of m bits, the third identification information of n bits, where n is an integer equal to or larger than 1, with first fixed information of (k-n) bits, and thereby outputs the fourth identification information.

9. The identification information generation device according to claim 8 comprising a first fixed information storage unit that stores the first fixed information.

10. An identification information generation method comprising:
separating a cryptographic key of k bits where k is an integer equal to or larger than 1, and second identification information of r-m bits, where m is an integer equal to or larger than 1, from first identification information of r bits, where r is an integer equal to or larger than 2, outputted from an identification information output unit that outputs a same response to a same request for response, the identification information output unit outputting the first identification information using a physical unclonable function (PUF) and;
outputting fourth identification information by connecting the second identification information with third identification information of m bits, the third identification information expositing one or more characteristics of x devices, thereby being capable of identifying the x devices; and
generating fifth identification information of r bits by performing predetermined processing on the fourth identification information by the use of the cryptographic key.

11. An identification information generation device comprising:
an information separation means for separating a cryptographic key of k bits, where k is an integer equal to or larger than 1, and second identification information of r-m bits, where m is an integer equal to or larger than 1, from first identification information of r bits, where r is an integer equal to or larger than 2, outputted from an identification information output means for outputting a same response to a same request for response, the identification information output means outputting the first identification information using a physical unclonable function (PUF);
an information connection means for outputting fourth identification information by connecting the second identification information with third identification information of m bits which exposits one or more characteristics of x devices, and can thereby identify the x devices; and an encryption means for generating fifth identification information of r bits by performing predetermined processing on the fourth identification information by the use of the cryptographic key.

\* \* \* \* \*